Oct. 22, 1963

J. D. VAN SICKLE ETAL 3,107,737

TILLAGE IMPLEMENT AND WHEEL THEREFOR

Filed July 3, 1961

INVENTORS.
James D. Van Sickle
BY Francis W. Brinker

Hovey, Schmidt, Johnson & Hovey
ATTORNEYS.

INVENTORS.
James D. VanSickle
BY Francis W. Brinker

ATTORNEYS.

INVENTORS.
James D. VanSickle
Francis W. Brinker

Oct. 22, 1963
J. D. VAN SICKLE ETAL
3,107,737
TILLAGE IMPLEMENT AND WHEEL THEREFOR
Filed July 3, 1961
4 Sheets-Sheet 4
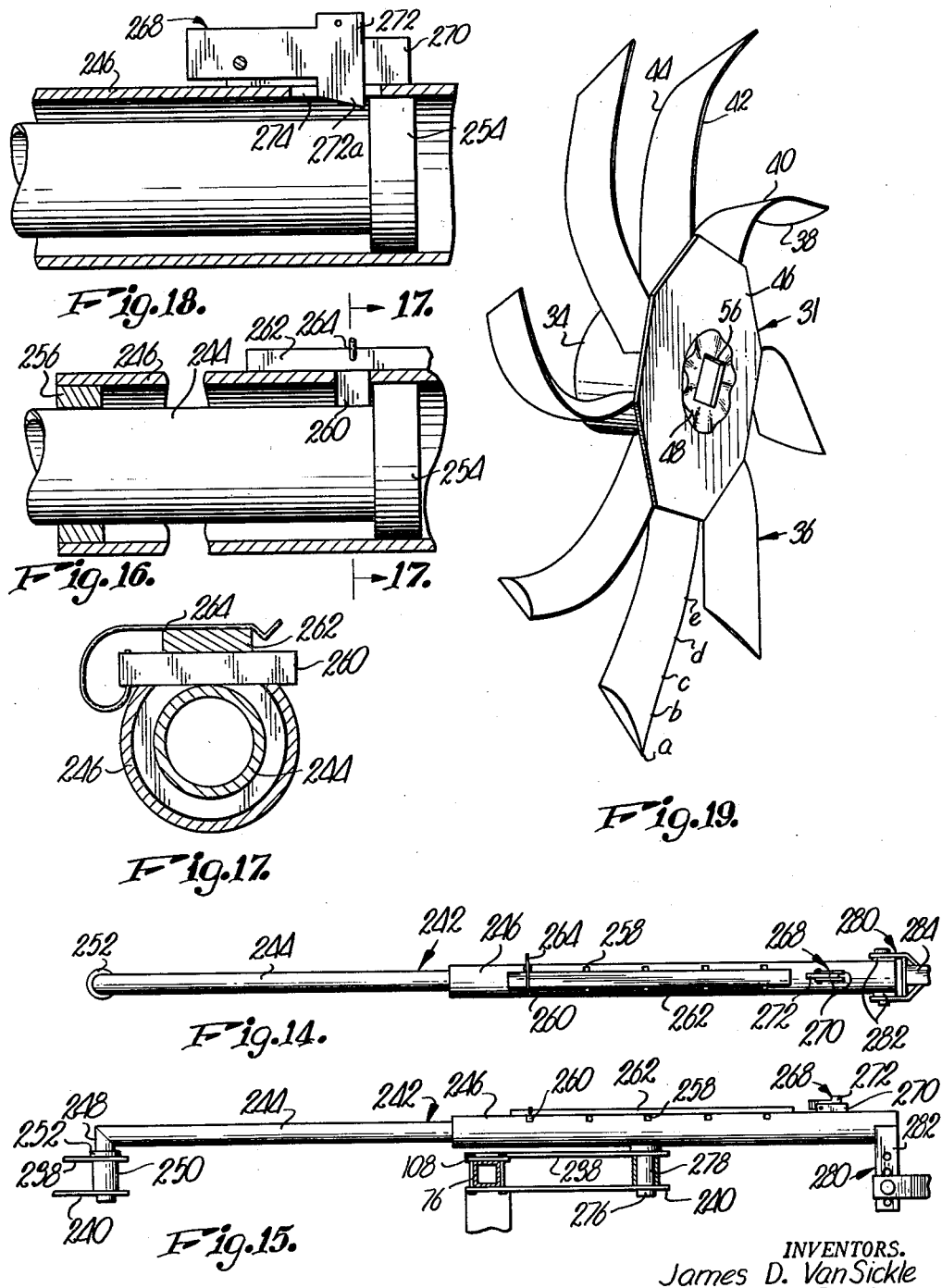
INVENTORS.
James D. Van Sickle
BY Francis W. Brinker
Hovey, Schmidt, Johnson & Hovey
ATTORNEYS.

United States Patent Office 3,107,737
Patented Oct. 22, 1963

3,107,737
TILLAGE IMPLEMENT AND WHEEL
THEREFOR
James D. Van Sickle and Francis W. Brinker, both of
Cawker City, Kans., assignors, by mesne assignments,
to Richardson Manufacturing, Inc., Cawker City, Kans.,
a corporation of Kansas
Filed July 3, 1961, Ser. No. 123,352
10 Claims. (Cl. 172—548)

This invention relates to improvements in farm machinery, and more particularly to a tillage implement, the primary object being to provide a tillage wheel implement especially well suited for use in what is commonly known as the "crop residue management" or "stubble mulch" method of farming.

In the agricultural method just mentioned, the stubble and straw and like residue of a crop remaining after harvest, is left on and near the surface of the ground to form a cover for protection against wind and water erosion and to conserve moisture in the soil. The ground should be worked to kill weeds or any volunteer crops, or to prepare a seed that in a manner to leave the straw evenly distributed over the surface of the ground, but firmly anchored thereto. This is best accomplished by disturbing the residue as little as possible while working the ground therebeneath.

Heretofore efforts have been made to kill the weeds and volunteer crops by pulling a blade under the surface of the ground to thereby cut the roots and loosen the top soil without moving the straw and stubble out of place. However, under certain conditions, such implements have been unsatisfactory because the blades pass beneath the root system of the weeds and they continue to grow. Also, in many cases the passage of the blades tends to form large clods leaving the field very rough and having furrows which are inclined to increase water erosion.

The use of the moldboard plow and conventional disc implements, may effectively destroy the weeds, but they also do away with the crop residue, as well as furrow the ground which leads to washing. Additionally, these implements tend to work the top soil too much, breaking down the cloddy texture thereof, resulting in fusing of the surface of the top soil following rainfall. Ths fusing of the upper surface prevents the moisture from soaking into the soil and causes it to run off, thereby losing much needed moisture and increasing water erosion. Further, conventional implements tend to pulverize the soil and leave the finer grains exposed on top to be blown away by winds. Thus, conventional tools have proved to be inadequate to meet the moisture conservation and erosion-resistant requirements of a tillage implement for use in crop residue management farming.

Accordingly, it is the most important object of the present invention to provide an implement having a novel tillage wheel capable of preparing an adequate seed bed without appreciably diminishing the amount of crop residue available at the surface for retarding erosion and conserving moisture in the soil.

A further highly important object of this invention is the provision of an implement having tillage teeth capable of piercing the trash to effectively till the soil yet being designed with self-cleaning characteristics to provide for the release of the trash thereby preventing any accumulation by the implement to retard the effectiveness of the tilling operation.

An equally important object of the instant invention is the provision of an implement with tillage wheels capable of lifting a series of intermittent chunks of soil leaving the upper surface in a cloddy condition with the finer particles of soil underneath as a further preventive against soil erosion from wind and water.

In connection with the last-mentioned object, it is an aim of the present invention to provide an implement which will leave a series of cup-like depressions in the soil for catching rainfall and allowing it to be absorbed with a minimum of runoff.

A further object of this invention is the provision of an implement which may be used with satisfactory erosion-resisting and moisture-conserving results when used alone or in conjunction with other implements in either the summer fallow, clean tillage, or crop residue management method of farming.

Still another object of this invention is the provision of an implement capable of properly tilling the soil without leaving continuous ridges or furrows which have heretofore served to channelize rainfall runoff resulting in serious water erosion problems.

Another object of this invention is the provision of a novel tillage wheel well-suited for uprotting weeds and lifting proper sized chunks of soil, yet having self-cleaning characteristics enabling the chunks of soil to be released without destroying the integrity of the desirable, erosion preventing clods.

A further aim of this invention is to provide an implement capable of tucking a portion of the stems of the trash lying on the ground surface into the soil to prevent the trash from being blown away and to retard the soil from being washed away.

Yet another object of this invention is to provide an implement capable of operation in field conditions where heavy amounts of trash are present on the surface of the ground without losing its effectiveness for killing weeds and mulching the soil.

Another aim of the invention is to provide an implement having banks of soil tilling wheels wherein the wheels on each respective bank are forced to rotate together, thereby obtaining maximum and substantially equal tilling of the soil by each wheel.

In the drawings:
FIGURE 1 is an end elevational view of a tillage wheel made pursuant to our invention;
FIG. 2 is a cross-sectional view taken along line 2—2 of FIG. 1;
FIG. 3 is an enlarged, transverse, cross-sectional view of one of the teeth of the wheel shown in FIGS. 1 and 2;
FIG. 4 is a plan view showing the shape of the depression formed in the ground by the action of a single tooth of a tillage wheel passing thereover with contour lines showing the peripheral margin of the depression at various depths and with lines tracing the locus of points located along the leading edge of the tooth during rotation of the wheels and forward movement of the implement;
FIG. 5 is a fragmentary, schematic representation showing the peripheral configuration of a series of depressions formed in the ground by action of five adjacent wheels on each of two banks of wheels of the implement;
FIG. 6 is an enlarged, fragmentary, elevational view of one bank of tillage wheels mounted on the implement of the invention, the teeth thereof appearing schematically for simplicity and parts being broken away to reveal details of construction;
FIG. 7 is a fragmentary, cross-sectional view taken along line 7—7 of FIG. 6 with parts broken away for clearness;
FIG. 8 is a fragmentary, plan view of the adjustable retaining means for securing one end of the bank of tillage wheels to the frame of the implement;
FIG. 9 is a cross-sectional view taken along line 9—9 of FIG. 8;

FIG. 14 is an enlarged plan view of the adjustable coupling assembly of the implement of FIG. 13;

FIG. 15 is an enlarged, elevational view of the assembly of FIG. 14, showing the connection thereof with the tillage banks with parts of the banks appearing in cross section for clearness;

FIG. 16 is a fragmentary, cross-sectional view on a still larger scale of the assembly of FIG. 14 showing the positioning means;

FIG. 17 is a cross-sectional view taken along line 17—17 of FIG. 16;

FIG. 18 is an enlarged, fragmentary cross-sectional view of the coupling assembly of FIG. 14 showing the latch means for holding the implement in its closed position; and FIG. 19 is a perspective view of the tillage wheel.

Briefly, this invention relates to an implement having a novel tillage wheel particularly well suited for soil tilling operations in those farming regions where erosion from both wind and rain must be kept to a minimum and moisture conservation must be at a maximum. The implement has one or more banks of ground-engaging tillage wheels mounted on a shaft for rotation with the shaft as the implement is pulled along the ground. A frame adjustably carries the shafts whereby the angle of the banks of wheels relative to the line of draft of the implement may be varied.

Each wheel is provided with a plurality of identical, elongated, longitudinally arcuate teeth circumferentially spaced around a cylindrical hub which extends longitudinally of the shaft far enough to engage a relatively flat web member of an adjoining wheel, thereby keeping the teeth of respective wheels of each bank spaced longitudinally of the shaft. The web member is provided with a polygonally-shaped opening therethrough for complementally receiving the similarly shaped shaft, and is secured to one end of the hub and one edge of each tooth.

Each tooth is pointed at its outer extremity and has a transversely convex leading surface and a flat trailing surface which merge to form a ground-severing leading edge extending longitudinally of the tooth. The latter is twisted about its longitudinal axis so that the outer extremity of the leading surface faces toward the direction of movement of the implement as the latter is operated.

As the wheels of a bank, disposed angularly to the line of draft, are rolled along the earth, the leading edge of a tooth enters the ground intermediate the ends of the tooth and the leading edge severs a chunk of dirt therefrom. Continued rotation withdraws the tooth from contact with the ground, and the then downwardly facing, longitudinally concave front surface drops the chunk of severed dirt to remain as a clod on top of the finer grains of soil loosened by the severing operation. The severing action of the leading edge also cuts and uproots weeds and volunteer crops and discharges the plants on top of the ground. The intermittent action of the successive teeth as the wheels roll along the ground, tills the soil but does not remove straw and crop residue from the surface region.

Figure 1:
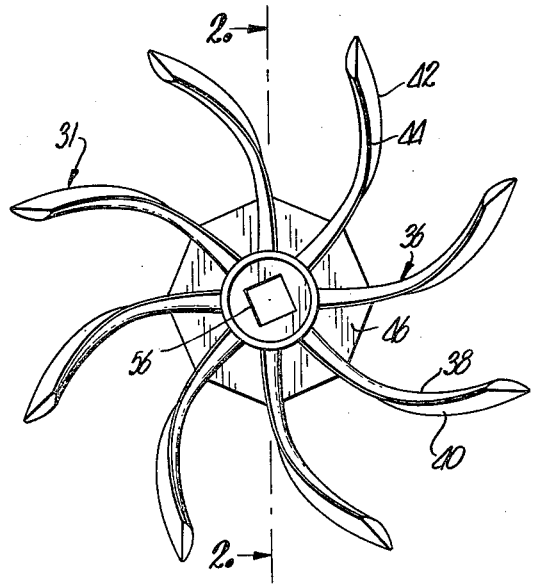
Figure 12:
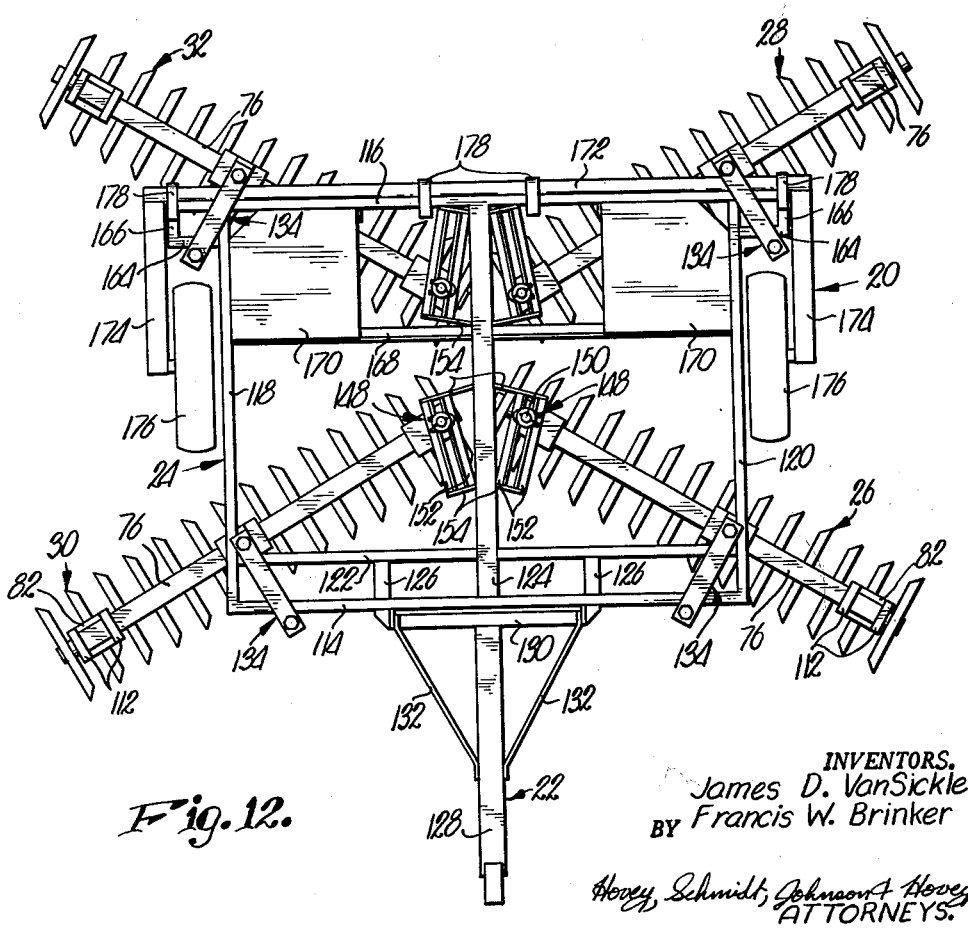
FIG. 12 is a plan view of the preferred form of a tillage implement made pursuant to our present invention, illustrating four banks of improved tillage wheels forming a part of the implement, the wheels shown schematically for simplicity.

Referring first to FIG. 12, the implement 20 comprises a hitch 22, a frame 24, and four tillage wheel banks 26, 28, 30 and 32. Each tillage wheel, shown in FIGS. 1 and 2, comprises a tubular hub 34 having a plurality of elongated, longitudinally arcuate teeth 36 circumferentially and equally spaced around hub 34 and extending radially outwardly therefrom. Each tooth 36 has a transversely arcuate, longitudinally concave, front face 38 comprising the leading surface of the tooth and a generally flat, oppositely disposed, longitudinally convex trailing surface 40. Face 38 and surface 40 merge into a leading edge 42 extending longitudinally of tooth 36 with an oppositely disposed trailing edge 44 extending parallel thereto. The respective teeth 36 are secured to hub 34 at one end, preferably by welding, and have a web member 46 secured to leading edges 42 and to hub 34. An extension 34a of hub 34 extends laterally therefrom in horizontally spaced relationship from the zone of attachment of teeth 36 and is adapted to abut the web member 46 of an adjoining wheel 31 when the wheels are operably disposed in side-by-side relationship in a respective tillage wheel bank 26—32 of implement 20. A series of protrusions 48, extending outwardly from web member 46 and disposed generally centrally thereon in spaced circular relationship, provide an annular, scalloped shoulder 50 adapted to be received within end portion 34a of an adjoining wheel 31 for stabilizing the latter. The protrusions 48 may be integral with and stamped from web 46.

Each tooth 36 is bent intermediate its ends so that it is twisted about its longitudinal axis with face 38 inclined toward web 46. It will be understood that the amount of twist varies gradually from 0° adjacent hub 34 to a suggested 25 to 30 degrees at the outer extremity of tooth 36. The amount of twist will vary, depending on the different tillage requirements for implement 20.

Figure 2:
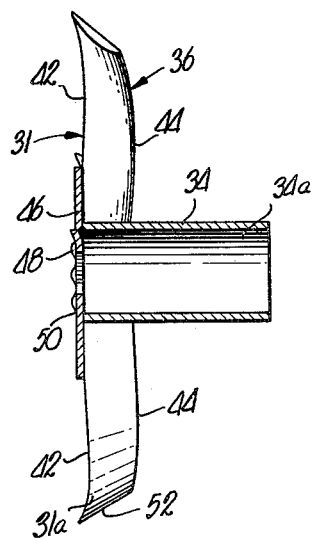

Leading edge 42 extends radially outwardly from hub 34 somewhat further than does edge 44, as clearly appears in FIGS. 2 and 19, and the tooth is cut off on a line between the outermost extremities of edges 42 and 44, thereby defining an edge 52 at the outermost end of tooth 36. Edge 52 and edges 42 and 44, define a point 31a at the outer end of tooth 31, with its apex coinciding with the line of merger of edges 52 and 42.

Figure 6:
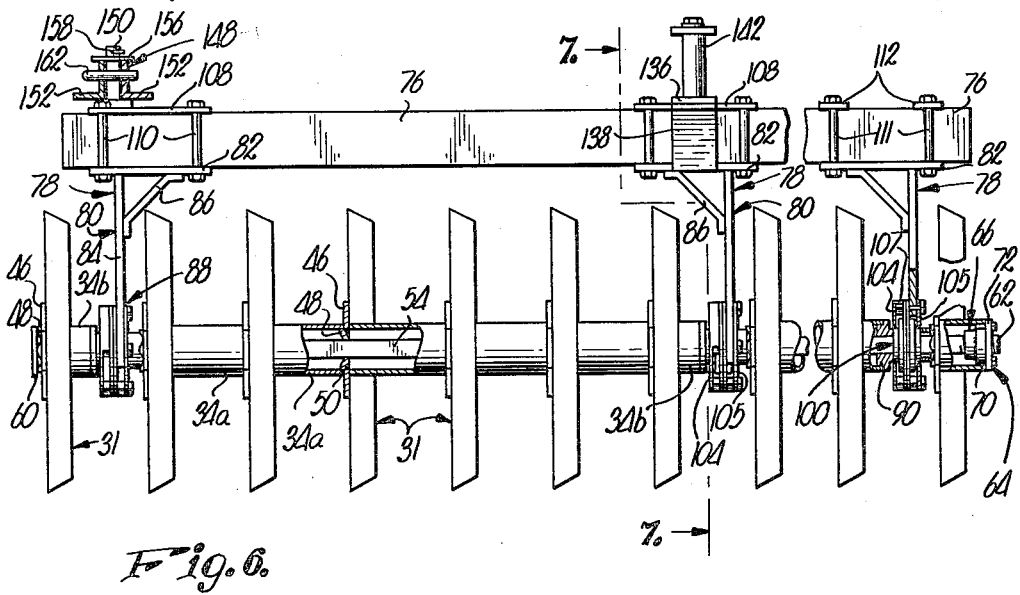

Referring now to FIG. 6, the wheels 31 of the respective banks 26—32, are disposed in horizontally spaced relationship upon a polygonally-shaped shaft 54 which extends the length of a respective bank. Shaft 54 is disposed through a complementally-shaped aperture 56 centrally located in each web member 46 in alignment with the horizontal axis of hub 34 of each of the respective wheels 31. A head 58, which may be integral with one end of shaft 54, is secured to a washer 60 which abuts the protrusions 48 on web 46 of the respective wheel 31 comprising the end wheel of each bank of tillage wheels. The wheels 31 are maintained in spaced relationship with protrusions 48 received within ends 34a of the adjacent wheel 31, as is shown in FIG. 6. A threaded portion 62 on the end of shaft 54 opposite from head 58, receives a nut 64 comprising a body portion 66 having an internally threaded aperture disposed to engage threaded portion 62 of shaft 54 and a cylindrical surface 70 adapted to fit snugly within extension 34a of the wheel 31 which is at the opposite end of the bank from head 58. A preferably polygonal head 72 of nut 64, having an opening 68 in coaxial alignment with the aperture in portion 66, may be secured by welding or the like to the outer end of portion 66, thereby providing a surface which may be engaged by a wrench for adjusting nut 64. Additionally, head 72 has a pair of internally threaded apertures extending parallel with shaft 54 and threadably receiving setscrews 74 which engage the outer end of hub extension 34a on the end wheel to prevent the nut 64 from working loose and disengaging from shaft 54.

Figure 7:
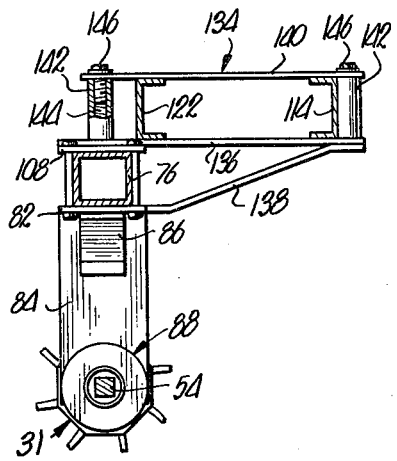
Figure 10:
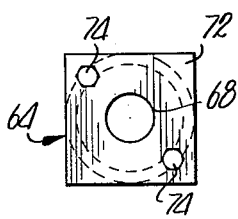
FIG. 10 is an enlarged, end elevational view of a retaining nut used to secure the tillage wheels on a respective shaft.
Figure 11:
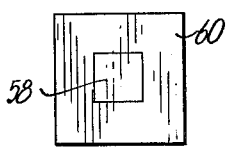
FIG. 11 is an enlarged, end elevational view of the head of the shaft used in mounting the tillage wheels on the implement.

The wheels 31 on shaft 54 are secured to a beam 76 overlying and extending in spaced relationship with shaft 54 by connector units 78. Each unit 78 includes a generally T-shaped strut 80 having a horizontally disposed, plate 82 engaging the underside of beam 76, and a leg 84 extending downwardly from plate 82. A diagonally disposed arm 86, rigidly secured to leg 84 and plate 82, lends stability to the strut 80. Leg 84 is bifurcated adjacent its lower end and extends on either side of shaft 54 as is best shown in FIG. 7.

A bearing assembly 88, received between the bifurcated section of leg 84, journals shaft 54 in leg 84. The hubs 34 of the wheels 31 adjacent assemblies 88, have somewhat shortened extensions 34b for accommodating the assemblies 88 and maintaining the proper spaced relationship between the teeth sections. Extensions 34b receive one end of a generally cylindrically-shaped spacer 90, having a circumferentially, outwardly extending flange abutting the end of extension 34b and its other end extending laterally therefrom longitudinally of shaft 54 and abutting the inner race of an antifriction bearing 100 of conventional configuration and not shown in detail.

The outer race of bearing 100 is bolted to leg 84 and is encased in a pair of circular shields 104 and 105 having aligned apertures for receiving and permitting the rotation of the inner race of bearing 100. An arcuate flange 107 extends laterally inwardly from shield 104 in overlying relationship to one side of outer race 102 to protect against dirt and matter from above, including weeds which may wind around the hubs 34, while the other side of race 102 is protected by the overlying leg 84.

As is apparent in FIGS. 6 and 12, each bank 26—32 has three connector units 78, one disposed just inwardly of the wheel 31 at either end of shaft 54, and one substantially at the longitudinal mid-point thereof. The struts 80 of units 78 at the middle, and the one end of the bank of wheels which lies within the periphery of frame 24 (FIG. 12), are secured to beam 76 by a plate 108 overlying the top beam 76 and bolted to plate 82 by bolt means 110, while the struts 80 located adjacent the outermost ends of the respective banks are secured to beam 76 by a pair of elongated straps 112 extending transversely of beam 76 and bolted to plates 82 by bolt means 111.

Referring to FIGS. 6, 7, 8, 9 and 12, frame 24 includes a pair of members 114 and 116 rigidly secured at either end to a pair of side members 118 and 120 interconnecting members 114 and 116. A second channel member 122 is spaced rearwardly from member 114 and is secured to members 118 and 120.

A member 124 extends from member 114 to member 116. A pair of supports 126 protrude forwardly from member 114 and have upstanding flanges 127 at the outer ends thereof for receiving one end of hitch 22 therebetween. The latter is substantially T-shaped, having a tongue 128 and a crossbar 130 rigidly secured to one end of tongue 128 and pivotally coupled to supports 126. A pair of diagonal braces 132 are secured to bar 130 adjacent respective ends thereof, and to a point intermediate the ends of tongue 128.

The respective tillage wheel banks 26—32 are coupled to the frame 24 by means of coupler units 134 shown in FIG. 7. A bottom member 136 of unit 134 is secured to plate 108 in overlying relationship thereto by welding or the like and extends horizontally forwardly from the longitudinal axis of beam 76. A brace member 138 extends generally diagonally therebetween for supporting the outer end of member 136. A second member 140, similar to and overlying member 136, is held in spaced relationship therewith by a pair of spacers 142 at each end of the members 136 and 140. Each spacer 142 is provided with an internally threaded bore 144 which receives stud bolts 146 therein for securing member 140 in position. The other ends of the spacers 142 are secured to the respective member 136. As best appears in FIGS. 7 and 12, members 114 and 122 are shiftably received within the units 134 on the front banks 26 and 30, being bounded by spacers 142 and members 140 and 136. These units 134 are free to slide on members 114 and 122 and, as is apparent, the shifting of banks 26 and 30 outwardly, is limited by members 120 and 118 of frame 24.

Member 116 extending across the rear of frame 24, projects outwardly beyond side members 118 and 120 and, with short members 164 extending outwardly from members 118 and 120 respectively and in spaced relationship with rear member 116, provides projecting structures at either rear corner of fame 24. End membes 166, running parallel with members 118 and 120, have their ends secured to respective members 116 and 164 to lend stability to the structure. The coupling units 134 for rear banks 28 and 32, are disposed over members 116 and 164 of the projecting structure as shown in FIG. 12 and quite similar to the disposition of units 134 for front banks 26 and 30 around members 114 and 122, as previously explained.

Adjustable connecting means broadly designated 148 overlying the connecting unit 78 at the innermost end of each respective banks 26—32, includes an upstanding stub shaft 150 rigidly secured to plate 108. The respective shafts 150 are adapted to be received between a pair of angle members 152 disposed in back-to-back, spaced parallelism, each pair extending generally horizontally and secured to, and at an angle from member 124 as is clearly shown in FIG. 12. It is apparent that those members 152 provided for shafts 150 of front banks 26 and 30, are situated with the front end of the channel formed by the spaced members 152 lying in relatively close proximity to member 124, while the other end thereof is spaced outwardly on opposite sides of member 124. However, those members 152 corresponding to rear banks 28 and 32, are affixed with the front end of the channel spaced from member 124 and the rear end thereof lying adjacent member 124. Thus, when the respective shafts 150 are lying adjacent member 124, the respective banks are disposed at a relatively small angle with the line of draft of implement 20. However, when the shafts 150 are shifted along members 152, rear bank 28 and front bank 30 are rotated in one direction and rear bank 32 and front bank 26 in the opposite direction. All banks are thus disposed at an angle to member 124 and consequently at a greater angle to the line of draft of implement 20. The angle of inclination of members 152 from member 124, is such that the leading edges of the innermost tillage wheels 31 of front banks 30 and 26 move parallel with one another as the shafts 150 are shifted along the members 152. Similarly, the trailing edges of rear banks 32 and 28 move parallel with one another. End elements 154 maintain members 152 at the prescribed angle from member 124 and prevent the respective shafts 150 from moving out from between members 152. A washer 156 secured on shaft 150 by cotter pin 158, overlies the upstanding leg of angle members 152 and supports beam 76 which in turn carries the bank of tillage wheels.

A series of aligned holes 160, spaced longitudinally along and extending through the upstanding legs of angle members 152, receive the legs of a U-shaped retainer pin 162 disposed around the respective shafts 150 to prevent the latter from moving longitudinally along members 152. Pin 162 is releasably secured in the holes 160 to permit removal of the pin for adjusting the angularity of the respective banks.

A rigid element 168, which may be an angle iron, extends from member 118 to member 120 across frame 24 in spaced parallelism with member 116 and supports a pair of weight boxes 170 in the rear corners of implement 20. Boxes 170 are adapted to carry whatever additional weight may be found necessary to properly adjust the depth to which the teeth 36 of the wheels 31 of the rearmost banks 28 and 32 enter the soil.

A transversely circular shaft 172 extends across the rear of implement 20 in close proximity to member 116 and has a pair of arms 174 extending forwardly therefrom spaced outwardly and parallel to respective members 118 and 120. A pair of wheels 176 which may be equipped with pneumatic tires, are pivotally coupled at the outer ends of arms 174. Shaft 172 is pivotally coupled to member 116 by a plurality of generally U-shaped, strap-like couplers 178 spaced horizontally along and each disposed around shaft 172 and having the ends thereof secured to member 116. Suitable means (not shown) are provided for pivoting shaft 172 within couplers 178, thereby rotating arms 174 about the horizontal axis of shaft 172. It will be readily understood that such rotation in one direction may depress wheels 176 so that they engage the ground beneath implement 20 sufficiently for raising the banks of tillage wheels from engagement with the ground. Conversely, rotation of shaft 172 in the opposite direction may sufficiently raise wheels 176, whereby teeth 36 of the tillage wheels 31 will engage and enter the surface of the soil.

Figure 13:
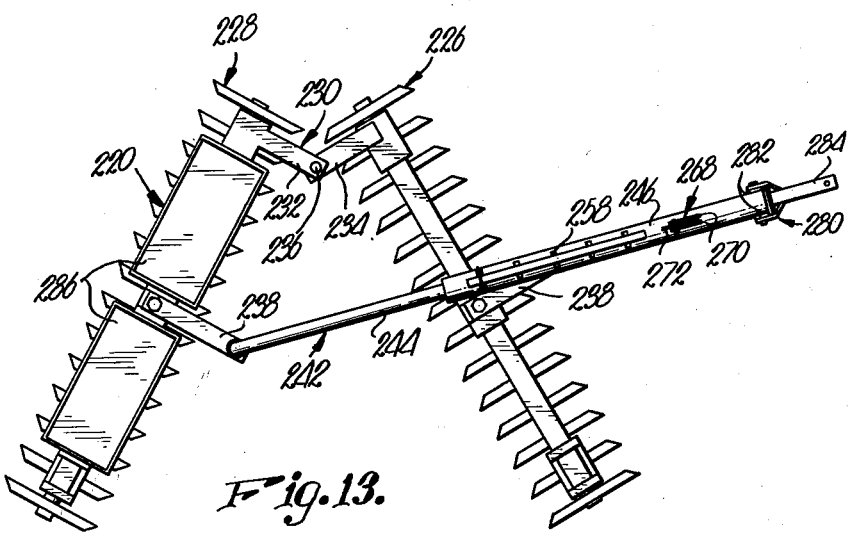
FIG. 13 is a plan view of another form of tillage implement made pursuant to our present invention having two banks of tillage wheels, the wheels appearing schematically for simplicity.

A modified form of implement broadly designated 220 in FIG. 13, includes an elongated hitch 222 and a pair of tillage wheel banks 226 and 228. The banks 226 and 228 are constructed identically with the banks 26 and 28 of implement 20, most clearly shown in FIG. 6. The banks 226 and 228 are interconnected adjacent one end by hinge means broadly designated 230 and including a strap 232 extending forwardly from plate 108 of rear bank 228, and a strap 234 extending rearwardly from plate 108 of front bank 226. Second straps (not shown) underlying respective straps 232 and 234, are spaced vertically from the latter to stabilize hinge 230 against rotation about a horizontal axis when the straps are pivotally coupled by an upright pin 236.

A strap 238 extends forwardly from beam 76 adjacent the middle of each bank 226 and 228 and has a second strap 240 underlying respective straps 238 in spaced relationship with the latter. A coupling assembly broadly designated 242 and including a transversely circular rod 244 and a transversely circular, tubular casing 246, interconnect the banks. Rod 242 has a depending leg 248 extending through aligned openings in straps 238 and 240 of bank 228, thereby pivotally coupling the latter to rod 242. A bushing 250 may be provided on straps 238 and 240 and a collar 252 on leg 248 maintains proper spacing between rod 244 and strap 238.

The end of rod 244 remote from leg 248, is received within casing 246 and is provided adjacent the outermost end with an annular enlargement 254 which complementally engages the inner cylindrical wall of casing 246 for sliding movement along the latter. A ring 256 secured in the end of casing 246 has an aperture for permitting sliding movement of rod 244 therethrough, but not large enough to allow enlargement 254 to slide from within casing 246. A series of transverse slots 258 spaced longitudinally along casing 246 are adapted to receive a key 260 which extends within casing 246 far enough to engage enlargement 254 and prevent the latter from movement toward ring 256, past the particular slot 258 in which key 260 is disposed. Enlargement 254 is free to slide toward the end of casing 246 remote from ring 256. A rib 262 extending longitudinally of casing 246 and secured to the latter, overlies the slots 258 and is disposed to be engaged by a spring clip 264 secured to key 260 for releasably retaining the key in a particular slot 258. It is apparent that key 260 may be selectively disposed in various slots 258 to permit greater or lesser extension of rod 244 from casing 246.

A catch mechanism broadly designated 268, positioned adjacent the end of casing 246 remote from ring 256, includes a pair of upstanding flanges 270 between which is pivotally coupled a catch 272 for swinging movement with respect to casing 246 and has a downwardly projecting ear 272a extending far enough into a slot 274 in casing 246 to engage enlargement 254 to prevent the latter from moving toward ring 256. Catch 272 is balanced so that it will normally remain with ear 272a in position to engage enlargement 254; however, it may be swung upwardly to permit enlargement 254 to pass. The lower extremity of ear 272a is inclined to permit the movement of enlargement 254 past catch 272 in the direction away from ring 256. Such movement swings catch 272 away until enlargement 254 has passed, at which time ear 272a is lowered to its engaging position.

The forwardly extending plates 238 and 240 of front bank 236 are pivotally coupled to casing 246 by a downwardly extending projection 276 secured to casing 246 and passing through aligned apertures in the plates 238 and 240. A bushing 278 may be provided for receiving projection 276.

A hitch 280 including a pair of downwardly extending legs 282 secured to casing 246, and a clevis 284, provides means for coupling implement 220 to a tractor or the like. Weight boxes 286 are secured to bank 228 to accommodate any additional weight which may be necessary to insure uniform operation of implement 220.

Figure 8:
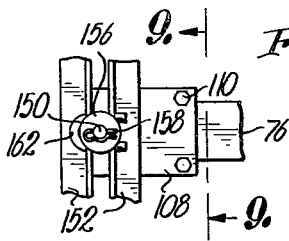
Figure 9:
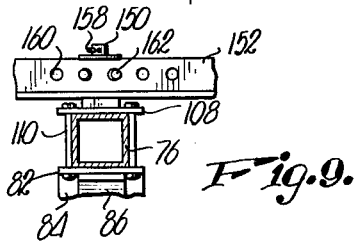

In operation, the front two banks of tillage wheels of implement 20 are disposed on either side of member 124 and in tandem relationship with the respective rear banks at an angle from the line of draft of implement 20, as shown in FIG. 12. The angularity of the banks may be adjusted by positioning shaft 150 along members 152 and they may be releasably secured in their selected positions by pin 162 as is shown in FIGS. 8 and 9. The wheels 176 are then raised to a position where the teeth 36 of the respective tillage wheels 31 engage the soil to be tilled by implement 20. The respective wheels 31 of a particular bank, are identically positioned on shaft 54 so that the leading edge 42 of each tooth lies on the same side of each wheel in any particular bank. It will be noted from viewing FIG. 12, that the wheels 31 are so positioned that the leading edges 42 of the respective teeth are spaced in the direction of the line of draft of the implement from edges 44. It will be understood that the line of draft is coincident with the longitudinal axis of tongue 128. As the implement 20 is pulled along the ground by a tractor affixed to hitch 22, the teeth of the tillage wheels engage the ground and are rolled therealong. Inasmuch as each wheel is nonrotatably secured to shaft 54, which is journalled in bearings 100, all of the wheels affixed on a particular shaft 54, must rotate together. It will be understood that substantially the same results may be obtained if wheels 31 are free to rotate individually on shaft 54.

As the wheels are rotated, each tooth 36 passes through whatever trash may be present and comes into engagement with the surface of the ground, with a portion of leading edge 42 intermediate point 31a and hub 34 making initial contact. Inasmuch as the wheels are disposed for rotation at an angle with respect to the line of draft of implement 20, they are caused to slide edgewise through the soil with leading edge 42 in front and slicing therethrough. At the same time that rotation of the wheel tends to cause the tooth to be withdrawn from engagement with the ground, other teeth are rotating into ground-engaging position. The combined sliding and rotation actions sever and partially elevate a chunk of the ground, but the continued rotation of wheel 31 causes the originally upwardly facing, longitudinally concave leading face 38 to be turned upside down, thereby dropping the chunk of soil. The finer granules of soil do not adhere to tooth 36 and have a tendency not to be lifted with the chunk of soil and, therefore, to remain in the bottom of the depression formed by the action of the tooth. The chunk is deposited upon the pulverized granules and remains on top in the form of a small clod. The action of the next succeeding teeth of wheel 31 as they engage the ground, is identical to that just described.

Figure 4:
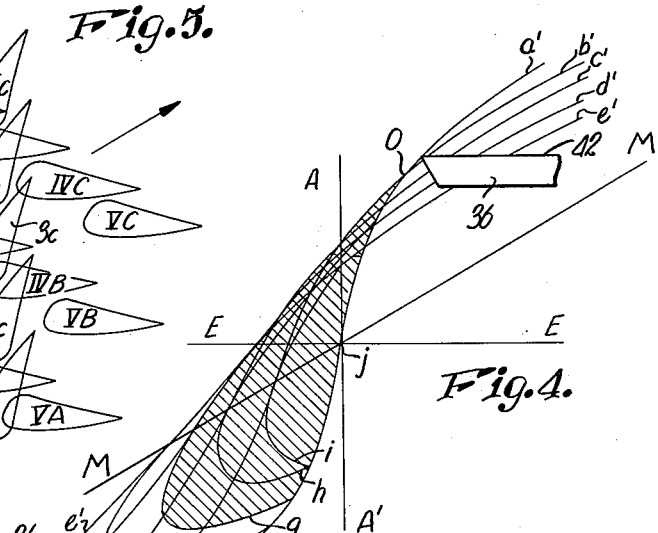

The action of a single tooth 36 during the time that it is in engagement with the ground while wheel 31 is making one revolution, is schematically represented by FIG. 4. Line A—A' represents the direction of the longitudinal axis of shaft 54 and consequently of hub 34. Line M—M represents the direction of movement of implement 20. Line E—E represents a plane parallel to the leading edges 42 of the teeth 36 and it will be noted to be perpendicular to line A—A'. Lines a', b', c', d', and e' of FIG. 4, schematically show the locus of five points located on the leading edge 42 of tooth 36 to show the movement of the tooth as it moves into and out of engagement with the soil. The point describing line a', lies on the outermost end of edge 42 and points b'—e' are regularly spaced inwardly at intervals of one inch measured along a radius of the wheel. Points a—e are indicated on one of the teeth 36 in FIG. 19.

When the banks 26, 28, 30 and 32 are set so that the teeth 36 penetrate approximately four inches into the soil, which has been found to be a satisfactory operating depth for normal conditions, the edge 42 first makes contact with the ground at about point c, and as the wheel rotates and slides sideways, it scoops out a shallow depression, the outer periphery of which is represented in the diagram by the closed line f.

At any given operating speed of implement 20, the sidewise components of motion (parallel to the axle comprising shaft 54) of all points on a tooth 36 are equal and remain constant. However, the components of motion at right angles to the axle of the different points on tooth 36, are a combination of that component of the forward motion of implement 20 and the rotation of the tillage wheel 31, and are neither equal nor constant. As the tooth 36 proceeds into the soil, the constant sidewise sliding movement thereof, coupled with the varying rate of the movement of the different points on the tooth 36 at right angles to the axle, causes points a—e to trace the differently curved lines a', b', c', d' and e' which are shown in the plan view, FIG. 4. It should be noted that the vertical movement of points a—e do not appear in this view, but are partially indicated by the closed lines f, g, h and i.

Line f represents the outer periphery of the depression scooped out by tooth 36 when it is operating at approximately a four inch depth. Lines g, h and i represent the periphery of the depression at levels spaced one, two and three inches beneath the surface respectively. Point j is the point of maximum penetration of tooth 36 at approximately the four inch depth. Tooth 36 is shown schematically in FIG. 4 just before it enters the ground and again just after it leaves the ground.

From an inspection of the closed line f, it will be seen that edge 42 first contacts the ground at a point somewhere between points b and c, and that this point has penetrated to a depth of one inch before point 31a enters the ground. This illustrates that the action of tooth 36 is somewhat similar to that of a blade, with edge 42 serving as the cutting edge. The pointed configuration of end 31a provides for a relieved area behind the outermost end of edge 42, and thus contributes toward a greater penetration of tooth 36.

The fact that the tooth 36 is twisted about its longitudinal axis so that front face 38 is inclined toward the line of draft of implement 20, causes leading edge 42 to be below trailing edge 44 at the moment tooth 36 first makes contact with the ground. This allows the tooth to penetrate easily into the ground because the trailing surface 40 is thus disposed at an angle which approaches being parallel with the direction of motion of tooth 36 as it slices through the ground. This angularity contributes to the inherent "suck" of implement 20, tending to pull the tillage wheels more deeply into the ground. If the angle is near 45°, the implement 20 will have maximum "suck" and will be prevented from operating at an ever increasing depth by wheels 176 engaging the ground. On the other hand, an angularity of approximately 20° has been found to impart sufficient "suck" for most soil conditions and allows that margin of trailing surface 40 remote from leading edge 42 to engage the soil and impart a desirable packing action thereto.

Tooth 36 is disposed with the longitudinally concave, forward, front face 38 facing generally upwardly at the moment edge 42 first makes contact with the ground. Point "a" is in front of all other points at this time. As the wheel 31 rotates, the longitudinal concavity of tooth 36 begins to invert and the points b—e, in inverse successive order, pass over point "a" until tooth 36 is completely inverted and the longitudinal concavity is facing downwardly. Accordingly, in inverse successive order lines a'—e' change over until line a', originally in front of the other lines, is now at the back. It will be noted that point "a" is the last point to leave the ground and that the inversion of the tooth is almost complete by this time. Point "O" on FIG. 4 indicates where point "a" on tooth 36 leaves the ground.

As tooth 36 moves in the direction of withdrawal from the ground, the longitudinal curvature of the tooth 36 is such that at some time while the tooth moves in the direction of withdrawal from the ground the slope of any particular portion of that part of the tooth which lies outside of the diameter of the web 46 will become parallel to the component of motion in the plane of the teeth of that particular portion, with the innermost portion first becoming parallel as described, and the portions out to the tip 31a will in successive order become parallel as the tooth continues to rotate with the wheel 31. Thus, at approximately the time that point "a" leaves the ground, point "e" is parallel as described, and as the tooth rotates further, this action continues in like manner through points "d," "c," "b," and "a," at which time wheel 31 has rotated approximately 60° from its position where point "a" disengaged from the ground.

The longitudinal concavity of tooth 36 is now completely inverted. The result of the slopes of tooth 36 at the different points therealong becoming parallel to the direction of motion of the respective points, beginning at the innermost point on the tooth and continuing to the outermost point, is to cause tooth 36 to strip or clean itself of residue or vegetation which may have collected thereon during the period that it was in contact with the ground.

Figure 5:
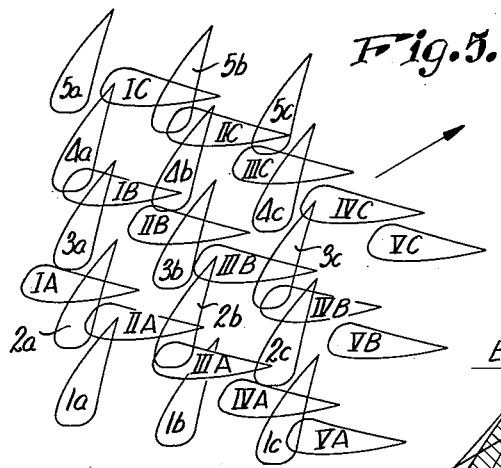
Figure 3:
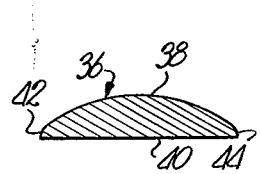

The successive actions on the ground at two inches below ground surface of five teeth in each of a front and a rear bank of tillage wheels of implement 20, is illustrated schematically in FIG. 5. The depressions caused by the teeth of the wheels of the front bank are designated by Roman numerals I–V, and the depressions caused by the teeth of the rear wheels are designated by Arabic numerals 1–5. The action of three successive teeth of each wheel have been illustrated, and are denoted by a–c following the Arabic wheel designation for the rear wheels and A–C following the Roman numeral designation for the front wheels. The line of motion of implement 20 while the pattern schematically represented by FIG. 5 is made on the ground, is designated by the arrow. It is obvious from an inspection of FIG. 5, that the tillage wheels of the rear bank are located so that the depressions caused by their respective teeth, tend to lie between the rows of depressions formed by the teeth of the front wheels. Although the depressions at a depth of two inches do not cover the entire surface area, it will be understood that the depressions at ground surface are much larger and do cover the entire surface. Thus, the entire area traversed by implement 20, is adequately tilled with no ridges or furrows left between the operation of the respective wheels. The shape of the depressions as shown in FIGS. 4 and 5, graphically reveal that they are cup-shaped and ideally suited to receive and absorb the rainfall and other precipitation that occurs on the farmland following tillage by implement 20.

The action of tooth 36 in the ground as wheel 31 rotates therein, not only tills the soil, but also entwines the roots of any weeds or volunteer crops which may be growing thereon. These weeds or plants are uprooted as the tooth 36 is withdrawn from beneath the ground and are left exposed on the surface to be killed by the action of the sun. Additionally, the uplifting of the small clod by tooth 36, followed by the subsequent dropping thereof, deposits the clod on a portion of the stems of the straw or weeds uprooted and has a tendency to anchor such trash and crop residue in place to prevent it from being blown away by the action of the wind.

The novel design of the teeth 36 of the wheels 31 allows implement 20 to be advantageously utilized in the tilling of the soil where large quantities of straw and stubble remain upon the surface. The elongated, relatively sharp teeth 36 pierce such trash and adequately till the soil, leaving the desired cloddy, upper surface to assist in the prevention of moisture loss from wind and water erosion.

The operation of implement 220 is similar to that of implement 20; however, banks 226 and 228 are initially situated substantially parallel. Inasmuch as there is no frame for carrying the tillage wheels, the wheels are always in contact with the ground and the banks 226 and 228 are held in their parallel, non-tilling positions by catch 272 engaging enlargement 254. When it is desired to dispose banks 226 and 228 at an angle with respect to the line of draft in order to cause the tillage wheels 31 to operate at the required depth, catch 272 is swung upwardly to permit enlargement 254 to slide past. A rope or the like may be affixed to catch 272 and extend to the tractor to facilitate this operation. As implement 220 is pulled forwardly, front bank 226 also moves forwardly, but rear bank 228 tends to remain in place as long as rod 244 is free to slide within casing 246. The banks pivot with respect to each other about hinge 230. The amount of angularity is determined by whatever slot 258 contains key 260, inasmuch as the latter limits the extent of sliding of enlargement 254 and causes rear bank 228 to be pulled along with implement 20. As long as the latter is pulled forwardly, enlargement 254 remains in abutting engagement with key 260. If key 60 is not in place, enlargement 254 may slide until it engages ring 256 in casing 246 and this is the position which allows maximum angularity of the banks.

The tilling operation of banks 226 and 228 is substantially the same as has been previously described with respect to implement 20 and will not be further detailed. It should be noted, however, that the absence of frame 24 provides for flexibility which permits the use of implement 220 for uniform tilling operations even on steeply inclined ridges and the like.

When it is desired to close the banks of tillage wheels, it is but necessary to back implement 220. This pushes front bank 226 toward rear bank 228 and the latter remains in place because enlargement 254 on rod 244 is free to slide forward within casing 246. The beveled edge of projection 272a, extending from catch 272, permits enlargement 254 to slide past, whereupon catch 272 again lowers into its normal position, thereby engaging enlargement 254 when implement 220 is again pulled forward. The automatic way in which catch 272 locks the banks in their non-tilling positions after backing of implement 220 is extremely useful for quickly and easily closing the banks for transporting implement 220 over patches of soil when it is not desired to till these areas because of improper soil conditions or the like.

The construction of implement 220, with clevis 284, casing 246 and rod 244 remaining in longitudinal alignment throughout the full range of adjustment of the tillage banks, automatically insures that the point of hitching implement 220 to a tractor will remain approximately on an extension of the resultant line of force of the total forces exerted by the ground on the tillage wheels during movement. Such resultant line of force is located at the midpoint of the banks and is directed perpendicular to the latter (and parallel with the direction of motion) when implement 220 is adjusted with banks 226 and 228 extending parallel with each other.

Coupling assembly 242 lies on this line when implement 220 is adjusted in this non-tilling position. The other, and purely theoretical extreme position of the resultant line of force (not obtainable with the structure of implement 220) would lie along the axle of the banks if the latter were disposed in longitudinal alignment with one another and extending parallel with the direction of motion of implement 220. All of the tilling positions available with implement 220 lie between these two extremes and the resultant line of force always lies between the midpoint of the banks and hinge 230.

Implement 220 is constructed so that clevis 284 is swung in the direction of hinge 230 as the angle of divergence of banks 226 and 228 is increased. By properly proportioning the lengths of straps 238, casing 246, clevis 284, and hinge 230, together with proper positioning of the points of pivotal connection of banks 226 and 228 to the coupler assembly 242, this construction insures that the hitch point is always positioned approximately on the resultant line of force. This in turn insures that implement 220 will be properly disposed behind the tractor to provide uniform tillage with both banks 226 and 228 traversing the same strip of ground.

Having thus described the invention, what is claimed as new and desired to be secured by Letters Patent is:

1. A tillage wheel comprising: a hub unit; and a plurality of elongated, ground-engaging teeth connected to and extending outwardly from the hub unit and spaced circumferentially therearound, each of the teeth being of longitudinally arcuate configuration and having a pair of opposed major surfaces, each of the surfaces having a longitudinal axis and a transverse axis and one of the surfaces of each tooth being longitudinally concave and the other surface of each tooth being longitudinally convex, the maximum effective transverse thickness of each tooth between said surfaces thereof being less than the effective transverse width of the respective tooth, said teeth being located on the hub unit in disposition with said transverse axes of the surfaces thereof being in generally parallel relationship to the axis of said hub, said major surfaces of each tooth converging throughout at least an outer zone of one longitudinal margin of the corresponding tooth to define an arcuate cutting edge extending longitudinally of the respective tooth whereby when the tillage wheel is moved forwardly over the ground along a line of draft at an angle to the axis of said hub unit and in a direction to cause the outer extremity of each tooth to trail the remaining portion of a corresponding tooth as the wheel rotates, said cutting edges of the teeth successively slice into the ground and sever spaced clods therefrom.

2. A tillage wheel as set forth in claim 1 wherein each of said teeth is of longitudinally twisted configuration.

3. A tillage wheel as set forth in claim 2 wherein each of said teeth is longitudinally twisted to a degree to cause the trailing longitudinal margin of the outer extremity of a respective tooth to be located above the outer extremity of the cutting edge of the corresponding tooth at the time the cutting edge thereof slices into the ground.

4. A tillage wheel as set forth in claim 3 wherein an imaginary transverse line through opposed longitudinal margins of each of the teeth adjacent the outer extremities thereof is at an angle of approximately 20° with respect to the horizontal at the time the cutting edge of a respective tooth slices into the ground.

5. A tillage wheel as set forth in claim 1 wherein one of the surfaces of each tooth is of transversely flat configuration and the opposed surface is transversely convex.

6. A tillage wheel as set forth in claim 5 wherein said one surface of each of the teeth is in direct facing relationship to the ground at the time the cutting edge of a respective tooth slices into the ground.

7. A tillage wheel as set forth in claim 1 wherein the outer transversely extending extremity of each tooth is at an angle with reference to the longitudinal axis of a corresponding tooth causing the outer end of the cutting edge of a respective tooth to lead the outer end of the opposed longitudinal margin of the tooth during forward advancement of the tillage wheel over the ground.

8. A tillage wheel as set forth in claim 1 wherein said hub unit comprises a tubular hub and a planar web member joined to said hub in generally axial relationship thereto, said web member projecting outwardly of the circumferentially extending surface of said hub and the teeth being attached to the hub and said web member respectively to rigidly support the teeth on said hub.

9. A tillage wheel comprising: a hub unit; and a plurality of elongated, ground-engaging, generally flat teeth connected to and extending outwardly from the hub unit and spaced circumferentially therearound, each of the teeth being of longitudinally arcuate configuration and having opposed, major, longitudinally extending concave and convex surfaces respectively, said major surfaces of each tooth converging throughout at least an outer zone of one longitudinal margin of the corresponding tooth to define an arcuate cutting edge extending longitudinally of the respective tooth whereby when the tillage wheel is moved forwardly over the ground along a line of draft at an angle to the axis of said hub unit and in a direction to cause the outer extremity of each tooth to trail the remaining portion of a corresponding tooth as the wheel rotates, said cutting edges of the teeth slice successively into the ground and sever spaced clods therefrom, each of the teeth being located on the hub unit in disposition and longitudinally helical in a direction to cause the cutting edge of each tooth to be located below and forwardly of the opposed longitudinal margin of the tooth in the direction of movement of the wheel at the time the respective tooth slices into the ground.

10. A tillage wheel as set forth in claim 9 wherein said convex surface of each tooth is transversely flat and said concave surface thereof is transversely convex.

References Cited in the file of this patent

UNITED STATES PATENTS

| | | |
|---|---|---|
| 388,567 | La Dow | Aug. 28, 1888 |
| 528,604 | Maul | Nov. 6, 1894 |
| 957,722 | Walker | May 10, 1910 |
| 1,115,839 | Kramer | Nov. 3, 1914 |
| 1,300,442 | Matoushek | Apr. 15, 1919 |
| 2,784,657 | Newkirk | Mar. 12, 1957 |
| 2,813,389 | Padrick | Nov. 19, 1957 |
| 2,996,130 | Guyer | Aug. 15, 1961 |